United States Patent
Chen et al.

[19]

[11] Patent Number: 6,144,710
[45] Date of Patent: Nov. 7, 2000

[54] JOINT MAXIMUM LIKELIHOOD SEQUENCE ESTIMATOR WITH DYNAMIC CHANNEL DESCRIPTION

[75] Inventors: Jiunn-Tsair Chen, New Brunswick; Young-Kai Chen, Berkeley Heights; Huan-Shang Tsai, Parsippany, all of N.J.

[73] Assignee: Lucent Technologies, Inc., N.J.

[21] Appl. No.: 09/065,193

[22] Filed: Apr. 23, 1998

[51] Int. Cl.[7] .............................. H03D 1/04; H03D 1/06; H03K 5/01; H03K 6/04; H04B 1/10
[52] U.S. Cl. ......................... 375/346; 375/231; 370/337
[58] Field of Search .................................. 375/341, 231, 375/254, 262, 346; 455/550; 370/337, 347

[56] References Cited

U.S. PATENT DOCUMENTS 5,995,499  11/1999  Hottinen et al. ..................... 370/337

OTHER PUBLICATIONS

Giridhar et al, Joint Demodulation of Co–channel Signals Using MLSE and MAPSD Algorithms, 1993, IEEE Communications (0–7803–0946–4/93), pp. 160–163.

Giridhar et al, Joint Estimation Algorithms for Co–channel Signal Demodulation, 1993, IEEE Communications (0–7803–0950–2/93), pp. 1497–1501.

Giridhar et al, Nonlinear Techniques for the Joint Estimation of Co–channel Signals, 1997, IEEE Communications (0090–6778/97), pp. 473–483.

Ilango et al, Near–Optimal Low Complexity Joint Estimation of Co–channel ISI Signals for Mobile Receivers, IEEE Communications (0,7803–5565–2/99), pp. 1330–1334.

Diggavi, S. Paulraj, A., "Performance of multi–sensor adaptive MLSE in fading channels," *IEEE Trans. Veh. Tech. Conf.*, VTC'97, Phoenix.

Giridhar, K., et al., "Joint estimation algorithms for cochannel signal demodulation," *IEEE International Conference on Communications,* ICC'93, Geneva.

Ranta, P.A., et al. "TDMA cellular network application of an interference cancellation technique," *IEEE45th Veh. Tech. Conf.,* VTC'95.

Chen, Jiunn–Tsair, et al., "Multi–channel MLSE Equalizer with Parametric FIR Channel Identification," *IEEE Trans. Veh. Tech.,* VTC'97, Phoenix, 1997.

(List continued on next page.)

*Primary Examiner*—Stephen Chin
*Assistant Examiner*—Thomas E McKiernan
*Attorney, Agent, or Firm*—Sofer & Haroun, LLP

[57] ABSTRACT

A cellular communication signal receiver receives a desired signal in the presence of at least one co-channel interference signal. The receiver comprises a channel estimator configured to receive a plurality of training signal samples to estimate the finite impulse response to the desired signal and the co-channel interference signal. The finite impulse response estimates having a predetermined number of channel taps defining the length of the desired channel and the length of co-channel interference channel. A Viterbi decoder is coupled to the channel estimator, and configured to receive the desired and co-channel interference signals. The channel estimator generates channel tap estimates. A power calculator is coupled to the channel estimator and configured to estimate the power of the estimated channel taps. A joint channel trimmer is coupled to the power calculator and configured to maintain a joint channel length, such that the desired signal channel length plus the co-channel interference channel length have a fixed size that defines the number of states the Viterbi decoder allocates to the desired signal and the co-channel interference signal.

12 Claims, 3 Drawing Sheets

OTHER PUBLICATIONS

Raleigh, Gregory, et al. "Characterization of Fast Fading Vector Channels for Multi–Antenna Communication Systems," *28th Asilomar Conference on Signals, Systems and Computers,* 1994, p. 853–7, vol. 2.

Vanderveen, M.C., Papadias, C.B. and Paulraj, A.J., "Joint angle and delay estimation (JADE) for multi–path signals arriving at an antenna array," *30th Asilomar conference on Signals, Systems, and Computers,* 1996.

Abrado, A. Benelli, G. and Cau, G.R., "Multiple–symbol differential detection of GMSK for mobile communications," *IEEE Trans. Veh. Tech.,* VT–44, Aug. 1995, pp. 379–389.

Buljore, S. And Diouris, J.F. "Theoretical study of a multi–sensor equalizer using the MSE for the radio mobile channel (GSM channel)," *28th Asilomar conference on Signals, Systems and Computers,* 1994, p. 94–98.

Steele, Raymond, "Mobile Radio Communications," *IEEE Press,* 1992.

JOINT MAXIMUM LIKELIHOOD SEQUENCE ESTIMATOR WITH DYNAMIC CHANNEL DESCRIPTION

FIELD OF THE INVENTION

This invention relates to a cellular communication system and more specifically to a receiver system that is employed to receive digitally modulated signals in the presence of another modulated co-channel interfering (CCI) signal.

BACKGROUND OF THE INVENTION

In mobile radio communications, the radio spectrum is a scarce resource. As a result most mobile radio communications system are based on the cellular principle. Basically, a geographical area, within which wireless service is available, is divided into several cells. Schematically, each cell is represented as a hexagon; in practice, however, each cell has a shape that is dependent on, among other things, the topography of the terrain serviced by the system. Each cell includes a base station, which may be located approximately at its center. Each base station is configured to transmit and receive signals within approximately the area defined by each cell. However, the actual radio range of each base station may extend beyond each cell area. Therefore, it is desired that a different set of frequencies be allocated to the adjacent cells to avoid interference. Subscribers located within each cell area communicate with other subscribers by using a wireless terminal (e.g., a cellular telephone, a wireless local loop terminal, some cordless telephones, one-way and two-way pagers, PCS terminals and personal digital assistants). Each wireless terminal located within a cell sends to and receives signals from the corresponding base station located in that cell, over a communications channel within a predetermined frequency range.

Since adjacent cells employ different sets of frequencies, the distance between two cells that use the same frequency set may be an important design consideration. This distance is called the mean reuse distance D. In order to increase the total number of channels available per unit area, it is desired to decrease the size of the cells. By reducing the size of the cells, it is possible to reuse the same frequency sets more often. Thus, more subscribers may be able to use the system, because of the increase of available frequency sets within a predetermined area. However, depending upon the size of each cell, the transmission power of the base stations and the mobile units, severe co-channel interference between the cells that use the same frequency range may occur.

The maximum likelihood sequential estimation (MLSE) equalizer can equalize the channel at the receiver to achieve optimal performance. The MLSE equalizer is particularly useful in a radio channel with a long spread such as the one that employs a standard specification known as Global System for Mobile Communications (GSM). Another approach to reduce co-channel interference is to employ antenna arrays. Because of the frequent spatial separation between the desired signal and the co-channel interference signals, antenna arrays can suppress co-channel interference signals through beam forming. However, these approaches require very complicated signal processing in order to produce optimal results.

Thus, there is a need to reduce the complexity of such systems, to make them commercially feasible, and to reduce the effects of co-channel interference signals considerably.

SUMMARY OF THE INVENTION

In accordance with one embodiment of the invention, a communication signal receiver includes a channel estimator that is configured to receive a plurality of training signal samples to estimate the finite impulse responses to both desired signals and co-channel interference signals. These finite impulse response estimates have a predetermined number of channel taps defining desired channel length and the co-channel interference channel length respectively. The channel tap estimates are then provided to a Viterbi decoder. The channel tap estimates are also provided to a power calculator that estimates the power of each of the estimated channel taps. The individual tap power estimates are then provided to a joint channel trimmer. The joint channel trimmer maintains a joint channel length, such that the desired signal channel length plus the co-channel interference channel length have a fixed size, by truncating the weakest taps from both edges of the channel taps. The joint channel length is dynamically allocated between the desired channel taps and co-channel interference channel taps. The trimmed channel sizes are then provided to the Viterbi decoder, which decodes the received signals in accordance with the channel estimates and the calculated channel sizes.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1:
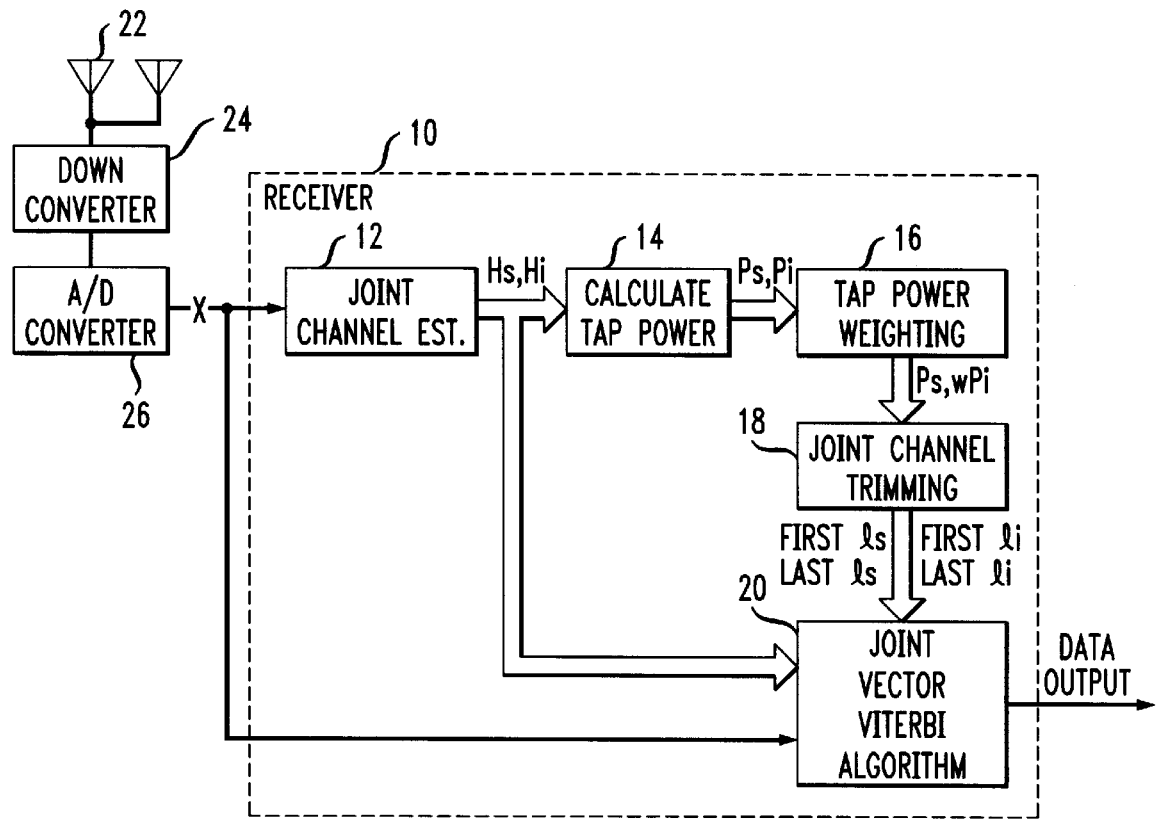
FIG. 1 illustrates a block diagram of a receiver in accordance with one embodiment of the present invention.

FIG. 1 is a block diagram of a communications receiver in accordance with one embodiment of the invention, although the invention is not limited in scope in that respect. Receiver 10 includes a joint channel estimator 12 which is configured to receive signal samples X from an analog to digital A/D converter 26. These signal samples are digitized version of signals that have been received by an antenna array 22 and down converted to baseband by a down converter 24.

Antenna array 22 receives both desired signals within a cell and co-channel interference signals from locations outside a cell. Joint channel estimator 12 is configured to jointly estimate the finite impulse responses of the channels for both the desired signal and the co-channel interference signal.

Several approaches are being employed with respect to signaling standards for digital cellular telephone worldwide. One such standard is Europe's global system for mobile communications (GSM), described in ETSI/GSM Series 03 Air Interference Specification, GSM PN Paris, herein incorporated by reference. One aspect of the standard involves the transmission of signals in the form of signal bursts.

Figure 2:
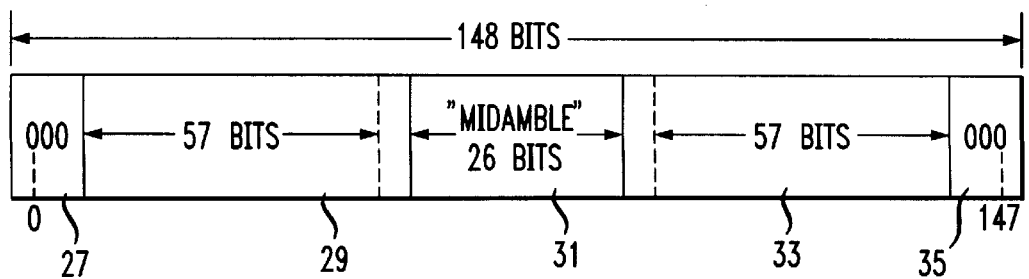
FIG. 2 illustrates a burst signal received by the receiver in accordance with one embodiment of the present invention.

FIG. 2 illustrates a signal burst also known as a transmission burst or a signal frame, such as may be employed in a time division multiple access (TDMA) wireless communication system, although the invention is not limited in scope to a signal burst having this particular form or format. In the present context, the terms signal burst, transmission burst or signal frame may be used interchangeably. The signal or transmission burst illustrated in FIG. 2 has a predetermined number of digital symbols or bits. In this particular embodiment, each burst includes, in succession, a series of successive predetermined starting bits 27, a predetermined number of information bits 29, a series of predetermined training bits 31, a second predetermined number of information bits 33, and a series of successive predetermined ending bits 35. In GSM systems, for example, there are three starting and three ending bits, 57 bits in both portions of the signal burst comprising binary digital signals to be transmitted, and 26 training bits, referred to as the "midamble," for a total of 148 bits per signal burst. The training bits are known at both the receiving and the transmitting end of the communications system. The starting and ending bits are likewise known and are typically "zeros." It will be appreciated that other numbers and distribution of bits are possible depending on the specification.

The GSM telecommunication standard requires a form of signal modulation in the baseband known as Gaussian Minimum Phase Shift Keying (GMSK). It is noted that although GMSK is not a linear modulation scheme it may be approximated as such. GMSK is described in more detail in *Digital Phase Modulation,* by J. B. Anderson, T. Aulin and C. E. Sundburg, 1986, available from Plenum, although, of course the invention is not limited in scope to GMSK modulation schemes.

Channel estimator 12 uses the training bits of an incoming burst as illustrated in FIG. 2, to calculate an estimate of the channels over which the transmission occurred. This channel estimate is the finite impulse response of the wireless channel through which the bursts are being transmitted from transmitter stations within a cell and outside a cell to a receiver station, such as receiver 10. The received signal is distorted due to noise and inter symbol interference (ISI) associated with transmission via the wireless channel. By minimizing the norm of the error signal, an estimate of the desired channel and co-channel interference channels is obtained. Each term in the impulse function is a complex quantity and is referred to in this context as a tap weight or channel tap. Each tap weight represents the effects of channel distortion on the transmitted signal, as will be explained in more detail below.

In order to obtain a channel estimate corresponding to both desired signals and co-channel interference signal, a channel model is employed as will be explained in more detail hereinafter.

Assuming a linear modulation scheme, the desired signal and the co-channel interference signal can be expressed respectively, as $$\bar{s}(t) = \sum_k g_s(t - kT)s_k \quad (1)$$

and $$\bar{s}_i(t) = \sum_k g_{i,k}(t - kT)s_{i,k} \quad (2)$$

where $g_s$, $g_i$ are respectively, the pulse-shaping functions of the desired signal and co-channel interference signal. $\{s_k\}$, $\{s_{i,k}\}$ are, respectively, the data sequences of the desired signal and co-channel interference signal, and T is the period of each symbol or signal sample. Therefore, the signal received at the $j^{th}$ antenna of antenna array 22 can be written as $$x_j(t) = \int c_{sj}(t-\tau)\bar{s}(\tau)d\tau + \int c_{ij}(t-\tau)\bar{s}_i(\tau)d\tau + n(t) \quad (3)$$

where $c_{sj}(t)$ and $c_{ij}(t)$ are respectively the physical channel impulse response of the $j^{th}$ antenna of the desired signal and co-channel interference signal; and n(t) is the additive noise. Substituting $\bar{s}(t)$ and $\bar{s}_i(t)$ from equations (1) and (2), equation (3) can be written as $$x_j(t) = \sum_k s_k h_{s,j}(t+iT) + \sum_k s_{i,k} h_{i,j}(t+iT) + n(t) \quad (4)$$

After sampling $x_j(t)$, equation (4) can be written in a matrix form as $$X_{m \times n} = (H_s)_{m \times l} S_{l \times n} + (H_i)_{m \times l}(S_i)_{l \times n} + N_{m \times n} \quad (5)$$

where the subscripts denote the size of the matrices; m is the number of antennas in antenna array 22; l is made long enough to cover all the non-zero terms of $h_{sj}$ and $h_{s,i}$, n time samples are under consideration in equation (5); the $i^{th}$ row of Hs is $[h_{sj}(\text{to}), h_{sj}(\text{to}-T), \ldots, h_{sj}(\text{to}-(l-1)T)]$ the $i^{th}$ row of Hi is $[h_{ij}(\text{to}), h_{ij}(\text{to}-T), \ldots, h_{ij}(\text{to}-(l-1)T)]$; S is a Toeplitz matrix with $[s_k, s_{k-1} \, s_{k-l+1}]^T$ as its first column and $[s_k, s_{k+1} \ldots s_{k+n-1}]$ as its first row; $S_i$ is also a Toeplitz matrix with $[s_{i,k}, s_{i,k-1}, \ldots s_{i,k-l+1}]^T$ as its first column and $[s_{i,k}, s_{i,k+1}, \ldots s_{i,k+n-1}]$ as its first row.

Equation (5) can be written as $$X = [Hs \ Hi]\begin{bmatrix} S \\ S_i \end{bmatrix} + N \quad (6)$$

wherein X refers to signal samples received by the receiver, and N is the additive noise received by the receiver. Assuming that noise N is a Gaussian white noise the least square solution can be written as $$[Hs \ Hi] = X\begin{bmatrix} S \\ S_i \end{bmatrix}^+ \quad (7)$$

where $(.)^+$ denotes pseudo-inverse, which is defined as $A^+ = (A^*A)^{-1}A^*$ It is noted that equation (7) provides the finite impulse response of the desired signal channel, $H_s$, and one co-channel interference channel $H_i$. However, there may be instances that more than one neighboring cell provides a co-channel interference signal. It is appreciated that equations (1) through (7) above may be expanded to incorporate additional co-channel interference signals. In that event, equation (7) may be expanded as $$[Hs \ H_{i,1} \ldots H_{i,n}] = x\begin{bmatrix} S \\ Si \\ \vdots \\ Sn \end{bmatrix}^+ \quad (7a)$$

wherein $H_{i,n}$ corresponds to finite impulse response of the co-channel interference signal provided via the $n^{th}$ channel from cell n proximate to the cell wherein the desired signal is transmitted and Sn is the training sequence provided by the base station at cell n.

Thus, joint channel estimator 12 is configured to derive channel estimates based on training bits and actual received signal as shown in equations (7) or (7a).

The channel tap estimates are then provided to a Viterbi decoder 20 to demodulate both the desired signal and the co-channel interference signal. The channel tap estimates are also provided to an input port of a tap power calculator 14. The output port of tap power calculator 14 is coupled to an input port of a tap power weighing unit 16, which is configured to multiply the channel taps corresponding to the co-channel interference taps by a weighing factor. Thereafter the output port of tap power weighting unit 16 is coupled to a joint channel trimmer 18, which is configured to truncate a plurality of channel taps corresponding to the desired signal and the co-channel interference signal such that the total number of taps representing the channel estimates for both signals remain a constant, as will be explained in more detail hereinafter.

The output port of joint channel trimmer 18 is coupled to an input port of joint Viterbi decoder 20, which is configured to have a fixed number of states as set forth by the number of taps specified by channel trimmer 18.

Tap power calculator 14 is configured to calculate the strength of each finite impulse response tap for both the desired signal and the co-channel interference signal. The strengths of the finite impulse response taps for the desired signal channel is referred to as Ps and the finite impulse response taps for the co-channel interference signal channel is referred to as Pi. Thus power signal Ps and power signal Pi can be written as $$P_s = 1_{1 \times m}(H_s \odot \text{conj}(H_s)), P_i = 1_{1 \times m}(H_i \odot \text{conj}(H_i)) \quad (8)$$

wherein $1_{1 \times m}$ is a column vector with each element being one, conj(.) denotes the complex conjugate operation and $\odot$ denotes the Hadamard product.

Figure 3:
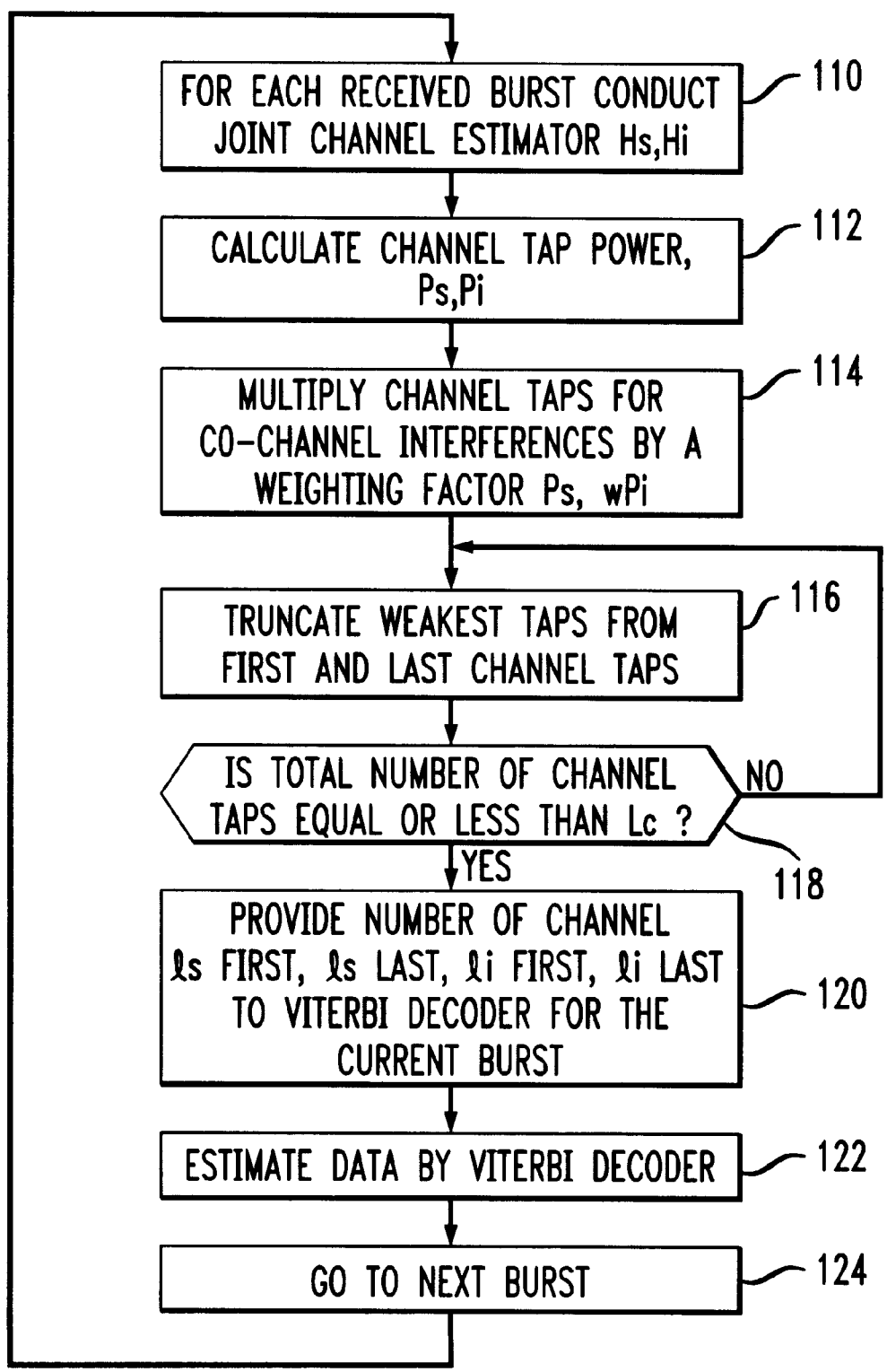
FIG. 3 is a flow chart illustrating the operation process of a system in accordance with one embodiment of the present invention.

FIG. 3 is a flow chart illustrating the operation of receiver 10 in accordance with one embodiment of the invention, although the invention is not limited in scope in that respect. During operation, at step 110, joint channel estimator 12 for each received burst obtains a joint channel estimation for both desired signals and co-channel interference signals received by receiver 10. Joint channel estimator 12 employs the training bits in each burst to obtain the joint channel estimation for the desired signals and co-channel estimation signals as described above. To this end joint channel estimator 12 provides a plurality of channel taps corresponding to the desired and co-channel interference signals.

At step 112 tap power calculator 14 calculates the power Ps and Pi of the channel taps obtained at step 110, in accordance with equation (8) as described above. Thereafter, at step 114 tap power weighing unit 16 multiplies a weighing factor w with channel tap power values corresponding to co-channel interference signal so as to de-emphasize the effect of co-channel interference signals. This follows, because the data bits embedded in the co-channel interference signal are of no interest to receiver 10. Preferably, the weighing factor w is chosen to be close but less than one.

At step 116, joint channel trimmer 16 truncates the combined number of channel taps corresponding to the desired and co-channel interference signal to a fixed specifiable number, $1_c$. It is noted that a large value for $1_c$ means relatively lower channel estimation error in the Viterbi decoder and relatively higher complexity. For example every unit increase to $1_c$ leads to doubling the complexity of the Viterbi decoder employed in receiver 10.

Thus, joint channel trimmer 18 truncates the end portions of channel taps corresponding to both desired and co-channel interference channels by finding the weakest tap power based on $$\min \{P_s(l_{s,first}), P_s(l_{s,last}), wP_i(l_{i,first}), wP_i(l_{i,last})\} \quad (9)$$

where $l_{s,first}$, $l_{s,last}$, $l_{i,first}$, $l_{i,last}$, are respectively, the first and the last taps of the finite impulse response channel taps of the desired and co-channel interference signals with $l_{s,first} \geq l_{s,last}$ and $l_{i,first} \geq l_{i,last}$. Thus, channel trimmer 18 compares the power corresponding to the first and last channel taps and eliminates the tap with the weakest power. For example, if the power of the first channel tap $P_s(l_{s,first})$ is the weakest, it gets truncated by the channel trimmer. Similarly if the power of the last channel tap $_H(l_{i,lsat})$ is the weakest tap, it gets truncated by the channel trimmer. Step 116 is repeated until channel trimmer 18 at step 118 determines that combined number of the remaining channel taps, i.e., $(l_{s,first} - l_{s,last}) + (l_{i,first} - l_{i,last}) = l_c$, wherein $l_c$ is a fixed number. It is noted that the term $(l_{s,first} - l_{s,last})$ corresponds to the remaining number of channel taps, $l_s$, corresponding to the desired signal and $(l_{i,first} - l_{i,last})$ corresponds to the remaining number of channel taps, $l_i$, corresponding to the co-channel interference channel.

It is noted that for those bursts with a high carrier to interference ratio (CIR), the system employs all the taps to describe the desired signal channel to reach the lower bound of a bit error rate. Conversely, for those bursts with a lower carrier to interference ratio, the system employs more taps for the co-channel interference channel so as to mitigate the impact of co-channel interference.

Once the channel taps corresponding to desired signal and co-channel interference signal is selected, Viterbi decoder 20 employs the remaining channel taps, indicated by $l_{s,first}, l_{s,last}, l_{i,first}$, and $l_{i,last}l_s$ and $l_i$ to decode the signals X that are provided from antenna array 22.

Thus, at step 120, Viterbi decoder 20 demodulates both the desired data sequences and co-channel interference data sequences. Viterbi decoder 20 is a maximum likelihood decoder that provides forward error correction. The Viterbi decoder works back through a sequence of possible bit sequences at each symbol instant to determine which bit sequences are more likely to have been transmitted. The possible transitions from a signal status at one symbol instant, or state, to a signal status at a subsequent, symbol instant or state is limited. Each possible transition from one state to a next state may be illustrated graphically and is referred as a branch in this context. A sequence of interconnected branches is referred to as a path in this context. Each state may transition only to a limited number of next states upon receipt of the next bit (or set of bits) in the bit stream. Potential paths remain while other potential paths are eliminated during the decoding process. Thus by eliminating those paths that are not permissible, computational efficiency may be achieved in determining the most likely paths to have been transmitted.

Figure 4:
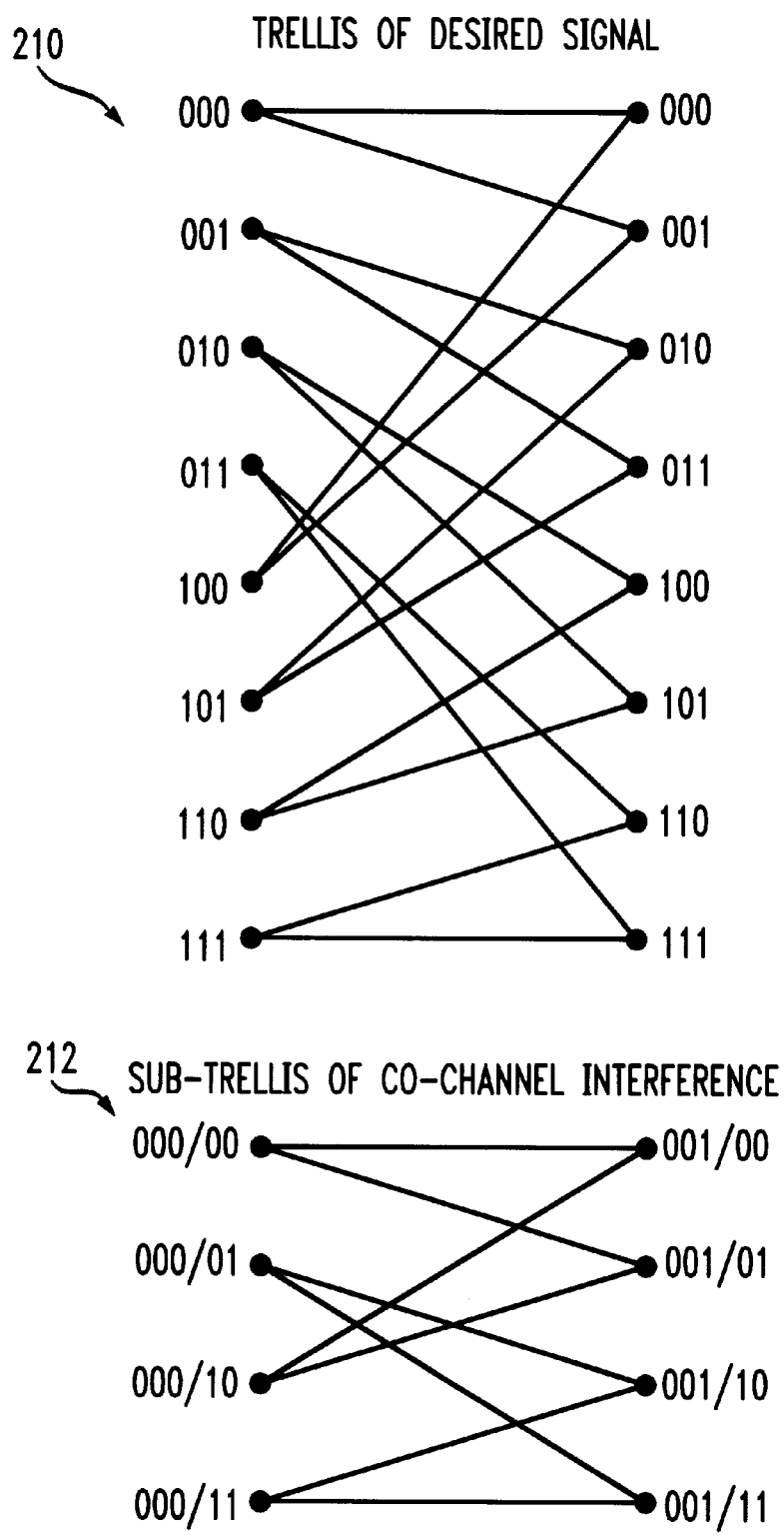
FIG. 4 illustrates a trellis diagram employed by a Viterbi decoder in accordance with one embodiment of the invention.

In accordance with one embodiment of the invention, because channel taps corresponding to desired signal and co-channel interference signal are truncated on a burst-to-burst basis, the number of states in the Viterbi decoder that correspond to the desired signal and the co-channel interference signal may differ from one burst to the other. For example, in accordance with one embodiment of the invention, the total number of channel taps $l_c$ may be 5, as illustrated in FIG. 4.

Thus, for an exemplary data burst, after channel truncation, channel trimmer 18 allocates three channel taps to the desired channel and two channel taps to co-channel interference channel. As illustrated in FIG. 4, Viterbi decoder 20 operates with an 8-state trellis 210 that correspond to the 3-tap channel memory corresponding to the desired channel, and with a 4-state trellis 212 that correspond to the 2-tap channel memory corresponding to the co-channel interference channel. Thus, as illustrated in FIG. 4, each branch in 8-state trellis 210 is expanded to 4-state trellis 212. The total number of states is the product of the numbers of the desired signal states and the co-channel interference states. Thus, for the example illustrated in FIG. 4, the total number of states is 32. Each state has four input branches and four output branches.

At step 122, the Viterbi decoder decodes the received signal. For each branch, Viterbi decoder 20 reconstructs the received signal $\overline{X}$. Viterbi decoder 20 then employs the Fobenius norm square of the difference between the reconstructed received signal and the actual received signal, $\|\overline{X}-X\|^2_F$, as the incremental metrics for each branch, wherein the operator $\|\cdot\|_F$, denotes the Fobenius norm. By minimizing the node metric in the Viterbi algorithm, Viterbi decoder 20, searches for the most likely data sequence in the trellis.

Once the data for one burst is estimated, step 110 is repeated again for following bursts.

Thus, in accordance with the present invention, a wireless receiver is able to receive signals with substantially low bit error rates. Furthermore, features such as weighing the channel power taps corresponding to co-channel interference signals, and truncating the total number of channel taps allow for a relatively simple and inexpensive arrangement.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. A cellular communication signal receiver for receiving a desired signal in the presence of at least one co-channel interference signal, said receiver comprises:

a channel estimator configured to receive a plurality of training signal samples to estimate the finite impulse response to said desired signal and said co-channel interference signal, said finite impulse response estimates having a predetermined number of channel taps defining the length of the desired channel and the length of co-channel interference channel;

a Viterbi decoder coupled to said channel estimator and configured to receive said desired and co-channel interference signals, and said channel tap estimates generated by said channel estimator;

a power calculator coupled to said channel estimator and configured to estimate the power of said estimated channel taps;

a joint channel trimmer coupled to said power calculator and configured to maintain a joint channel length, such that the desired signal channel length plus the co-channel interference channel length have a fixed size that defines the number of states said Viterbi decoder allocates to said desired signal and said co-channel interference signal.

2. The receiver in accordance with claim 1, wherein signals received by said receiver are formatted as signal bursts, and said channel estimator estimates said channels on a burst-by-burst basis.

3. The receiver in accordance with claim 2, wherein said joint channel trimmer is coupled to said Viterbi decoder.

4. The receiver in accordance with claim 3, further comprising a power weighing unit coupled to said tap power calculator configured to multiply said estimated channel taps corresponding to co-channel interference signal by a weighing factor.

5. The receiver in accordance with claim 4, wherein said weighing factor is less than one and said power weighing unit is coupled to said joint channel trimmer.

6. The receiver in accordance with claim 5, wherein said channel trimmer dynamically allocates said fixed channel length between the desired channel taps and co-channel interference channel taps.

7. A method for receiving a desired signal in the presence of at least one co-channel interference signal, said method comprising the steps of:

(a) receiving a plurality of training signal samples;

(b) in response to said signal samples estimating the finite impulse response of channels corresponding to said desired signal and said co-channel interference signal, by generating a predetermined number of channel taps defining the length of the desired channel and the length of co-channel interference channel;

(c) calculating the power corresponding to each one of said estimated channel taps;

(d) trimming said channel taps so as to maintain a joint channel length, such that the desired signal channel length plus the co-channel interference channel length have a fixed size; and (e) decoding signals received by said receiver by employing said trimmed channel taps.

8. The method in accordance with claim 7, further comprising the step of repeating steps (a) through (e) on a burst by burst basis.

9. The method in accordance with claim receiver in accordance with claim 8, wherein said decoding step comprises the step of Viterbi decoding said received signals.

10. The method in accordance with claim 9, further comprising the step of multiplying said estimated channel taps corresponding to co-channel interference signal by a weighing factor.

11. The method in accordance with claim 10 comprising the step of setting sad weighing factor to a number less than one.

12. The method in accordance with claim 10, wherein said trimming step further comprised the step of dynamically allocating said fixed joint channel length between the desired channel taps and co-channel interference channels taps, on a burst-by-burst basis.

* * * * *